CONVERSION OF OLEFINES
Edward Denis Michael Eades and Philip Richard Hughes, Stockton-on-Tees, England, assignors to Imperial Chemical Industries Limited, London, England
No Drawing. Filed Aug. 1, 1969, Ser. No. 846,965
Claims priority, application Great Britain, Aug. 23, 1968, 40,474/68; Nov. 29, 1968, 56,786/68
Int. Cl. C07c 3/62
U.S. Cl. 260—683 D
3 Claims

ABSTRACT OF THE DISCLOSURE

A process for disproportionating olefines using an organo-metal compound and a compound of tungsten, molybdenum or rhenium, in which the tungsten, molybdenum, or rhenium is in a higher or its highest valence state, in such proportions that the atomic ratio of the metal of the organo-metal compound to tungsten, molybdenum or rhenium exceeds 2:1.

---

This invention relates to the disproportionation of olefines to olefine products of extended molecular weight range.

The present invention provides a process for the disproportionation of an olefine or a mixture of olefines into olefines of higher and lower molecular weights which comprises bringing the olefine or mixture of olefines into contact in a liquid phase with an organo-metal compound and a compound of tungsten, molybdenum or rhenium, in which the tungsten, molybdenum or rhenium is in a higher or its highest valence state, in such proportions that the atomic ratio of the metal of the organo-metal compound to tungsten, molybdenum or rhenium exceeds 2:1 and separating from reaction products a fraction containing olefines formed by disproportionation of an unsymmetrical olefine obtained by isomerisation in situ of a symmetrical olefine that has either been supplied as feed or been produed in situ as a disproportionation product.

The compound of tungsten, molybdenum or rhenium preferably involves the metal in the highest valence state. It may be, for example, a halide, for example tungsten hexachloride, or preferably, an oxyhalide, for example tungsten oxytetrachloride. Alternatively and more preferably, it may be a compound or compounds produced by reacting a halide of tungsten, molybdenum or rhenium with an alcohol and removing the hydrogen halide formed. Thus, tungsten hexachloride in solution in a hydrocarbon such as benzene may be reacted with ethanol and the hydrogen chloride formed removed from the solution by blowing a dry, oxygen-free gas, for example, nitrogen, through it. The molar ratio of tungsten hexachloride or other halide to ethanol may be for example, in the range 1:1 to 1:3 and analysis has shown that the solution contains compounds such as WOCl$_4$, WOCl$_3$(OEt) and WOCl$_2$(OEt)$_2$ as reaction products. The solution (absent hydrogen halide) may be used as such in the conversion of olefines according to the process of the invention. Alcohols other than ethanol may be used in the formation of the compound of tungsten, molybdenum or rhenium. For example, the alcohol may be methanol, propanol, isopropanol, tertiary butanol and benzyl alcohol. Further, other compounds containing a hydroxy group may be used such as for example, water, peroxides and phenols.

Whatever compound of tungsten, molybdenum or rhenium is used it is essential that it is free from hydrogen halide since the presence of hydrogen halide has been shown to prevent isomerisation of symmetrical olefines to unsymmetrical isomers which is essential for the production of disproportionation products of extended molecular weight range.

The organo-metal compound may be, for example, a metal alkyl, a metal alkyl halide or an alkali metal naphthalide. It is preferably an alkyl aluminium halide, especially an alkyl aluminium dihalide for example ethyl aluminium dichloride.

The liquid reaction phase may be provided by the olefine or olefines undergoing conversion, a product of the process or an extraneous solvent which is inert under the conditions of the process. Suitable inert solvents include hydrocarbons and chlorinated hydrocarbons, particularly aromatic hydrocarbons and chlorinated aromatic hydrocarbons.

The pressure should be sufficient to maintain a liquid phase and may conveniently be from 1 to 50 atmospheres. Suitable reaction temperatures are in the range of from —50 to 200° C.

The process of the invention is applicable to the conversion of a wide range of olefins for example, propylene, butenes, pentenes and hexanes. It is applicable to the conversion of symmetrical olefines such as butene-2 and mixtures of olefines containing symmetrical olefines since the catalyst system has isomerising as well as disproportionating activity. Mixtures of C$_4$ hydrocarbons containing butene-2 are available commercially in large quantities and by applying the process of the invention to such mixtures there may be provided olefines suitable for the manufacture of plasticiser alcohols by the oxo process.

The following examples illustrate the process of the invention.

EXAMPLE 1

1 molar equivalent of ethanol was added to a 0.05 molar solution of tungsten hexachloride in benzene and dry, oxygen-free nitrogen passed through the resulting solution for 0.5 hour. Sufficient of this solution was added to a solution of pentene-2 in benzene to give a molar ratio of pentene-2 to tungsten metal of 5000:1 followed by sufficient of a hydrocarbon solution of ethyl aluminium dichloride to give an atomic ratio tungsten to aluminium of 1:4. After 0.5 hour at 20° C. and atmospheric pressure the solution contained propene, butene, hexene, heptene and octene as well as unchanged pentene-2. The ratio of C$_4$+C$_6$ hydrocarbons to C$_3$+C$_7$ hydrocarbons was 8:1 and the conversion of pentene-2 was 60%.

EXAMPLES 2–3

These examples demonstrate under strictly controlled conditions with the aid of comparison experiments the kind and degree of catalytic activtiy shown by particular catalyst components both in the presence and absence of hydrogen chloride and in differing relative proportions of the organo-metal and tungsten-containing compounds of the catalyst.

The examples show very clearly the importance of using more than twice, preferably up to four times or more, the quantity (on a metal:metal atomic weight basis) of the organo-metal compound (particularly organo-aluminium halide) than the tungsten compound.

These examples involve as organo-metal compound ethyl aluminium dichloride but it will be clear to those versed in this art that other alkyl radicals might have replaced the ethyl radical in this compound with essentially similar results and that a halogen other than chlorine might have been present. It will further be clear that the sesquihalide analogue triethyl (say) di-aluminium trichloride could equally have been used. It should, however, be emphasized that the results to be obtained are not wholly insensitive to the nature of the alkyl substituent(s) of the aluminium compound nor to the relative proportions of alkyl and halogen substituents in the organo-aluminium compound. In general trialkyl aluminium compounds such as triethyl aluminium should be avoided on account of their pronounced reducing capability and their relatively low Lewis acidity which militates against ready involvement in complex interaction with the tungsten (say) compounds in the catalyst solution. It is, of course, a straightforward (albeit tedious) exercise to establish the degree of suitability of any alternative related trialkyl aluminium or alkyl aluminium halide.

The tungsten compounds involved in these examples were characterised by analytical techniques including infra-red spectroscopy. The compounds used were severally $WCl_6$, $WOCl_4$, $WOCl_3(OEt)$, $WOCl_2(OEt)_2$. The alkoxy derivatives are all ethoxy derivatives, but other alkoxy derivatives, say, of other alkanols might equally have been used.

The importance of ensuring that the catalyst solution is free of hydrogen halide (e.g. HCl) is well demonstrated by the comparison experiments. It will be seen that in all cases in which hydrogen halide was present in the catalyst medium no isomerisation of symmetrical olefines (either as feed olefines or first-product olefines) occurred and hence disproportionation to higher olefines or further disproportionation to olefines of extended molecular weight range did not take place. On the other hand, in all cases where hydrogen halide (here HCl) was absent isomerisation of symmetrical olefines in the feed and in a first stage product took place giving substantial proportions of extended molecular weight range olefines.

The processes of these examples were carried out within the preferred temperature range of from 0° to 100° C., the temperature actually chosen being 20° C. The processes were batch processes and accordingly the pressure could conveniently be atmospheric. In a continuous, non-batch, process, a somewhat higher pressure might on balance be the most convenient.

It is advantageous to prepare a hydrogen halide-free solution of the tungsten component to be incorporated in the catalyst medium and thereafter to bring it into admixure with the organo-metal compound, for example by blending benzene (or other inert organic solvent) solutions of the two components. Accordingly, this procedure was adopted in the examples.

EXAMPLE 2

Preparation of tungsten precursor solutions

A series of solutions containing various tungsten compounds was produced from a solution of tungsten hexachloride in benzene (0.05 molar) by successive additions at room temperature of molar equivalents of ethanol followed by purging the several solutions with dry, oxygen-free, nitrogen for periods of 0.5 hour.

The steps involved can be represented as in the followed scheme of substances present in the solvent benzene at various stages.

| Initial composition (before EtOH addition) | Intermediate composition (before N₂ purging) | Final composition |
|---|---|---|
| $WCl_6$ (Solution A) | $WOCl_4 + EtCl + HCl$ (Solution B) | $WOCl_4$ (Solution C) |
| $WOCl_4$ (Solution C) | $WOCl_3(OEt)$ HCl (Solution D) | $WOCl_3(OEt)$ (Solution E) |
| $WOCl_3(OEt)$ (Solution E) | $WOCl_2(OEt)_2$ HCl (Solution F) | $WOCl_2(OEt)_2$ (Solution G) |
| $WOCl_2(OEt)_2$ (Solution G) | | |

The quantities of ethylchloride and hydrogen chloride purged from the solutions at successive stages were strictly molar equivalents. The tungsten solute of solution C showed, on infra-red spectroscopic analysis, only peaks characterising W—O bonds whereas the solutes of solutions E and G showed on such analysis peaks characterising W—O bonds as well as C—O and C—H bonds.

Disproportionation of pent-2-ene using tungsten precursor solutions A, B, C, D, E, F and G To identical quantities of an air-free anhydrous mixture of pent-2-ene (10 mls.) in benzene (15 mls.) were added quantities of respective tungsten precursor solutions A to G such that in each case the ratio of the molar proportion of pent-2-ene to tungsten compound in the resultant mixture was 5000:1. A quantity of ethyl aluminium dichloride in hydrocarbon solution as set out in the following Table I was then added to each of these mixtures and after a reaction period in each case of 0.5 hour at a temperature of 20° C., and atmospheric pressure, the product solutions were analysed to determine their contents of olefine having up to 8 carbon atoms by gas/liquid chromatography using benzene as internal standard.

The products and their relative proportions are set out in Table I and the production of two types of product mixture is clearly demonstrated. In the case of solutions A, C, E and G higher olefines than the starting material and the products of first disproportionation are present; in the case of solutions B, D and F no such higher olefines are present. These two types of product are given the notations I and II in Table I. It can also be seen from Table I that before a product of Type II can be obtained it is necessary further that the atomic ratio of aluminium to tungsten in the catalyst solution should be greater than 2:1, and preferably up to 4:1 or even higher, say within the range of from 4:1 to 12:1.

TABLE I

| Tungsten precursor solution | Catalyst molar ratios | | | Pentene conversion, percent | Product type | Mole ratio $C_4+C_6$: other products |
|---|---|---|---|---|---|---|
| | $WCl_6$ | EtOH | $EtAlCl_2$ | | | |
| A | 1 | 0 | 2 | 44 | I | |
|   | 1 | 0 | 4 | 60 | II | 7.5:1 |
| B | 1 | 1 | 2 | 50 | I | |
|   | 1 | 1 | 4 | 50 | I | |
| C | 1 | 1 | 0.5 | 48 | I | |
|   | 1 | 1 | 1 | 48 | I | |
|   | 1 | 1 | 2 | 50 | I | |
|   | 1 | 1 | 4 | 60 | II | 6:1 |
|   | 1 | 1 | 4 | 64 | II | 8:1 |
| D | 1 | 2 | 4 | 50 | I | |
| E | 1 | 2 | 2 | 10 | I | |
|   | 1 | 2 | 4 | 57 | II | 7:1 |
| F | 1 | 3 | 4 | 48 | I | |
| G | 1 | 3 | 4 | 48 | II | 10:1 |

EXAMPLE 3

Disproportionation of hex-3-ene

Three batch experiments were carried out in an analogous manner to that already described in Example 2 for pent-2-ene, the last experiment being allowed to continue for a further consecutive period of 30 minutes in order to show the difference in the hexene conversion and the proportions of different product olefines obtained after 30 and 60 minutes reaction times. The results are set out in Table II and it can be seen that no new products resulted from the experiment using solution B (even though the Al:W atomic ratio was 4:1) nor from the experiment using solution C when the atomic ratio of Al:W was merely 2:1. The products were analysed for the presence of $C_2$–$C_9$ olefines in the manner already described.

It can be seen from Table II that the product from the experiment using solution C at an Al:W atomic ratio of 4:1 was of Type II and that the conversion of hex-3-ene increased, and the relative proportion of product olefines changed, on prolonging the reaction period.

TABLE II

| Tungsten precursor solution | Catalyst mole ratios | | | Hexene conversion, percent | Reaction time, mins. | Product composition |
|---|---|---|---|---|---|---|
| | $WCl_6$ | EtOH | $EtAlCl_2$ | | | |
| B | 1 | 1 | 4 | 0 | 30 | Hexene-3, 100%. |
| C | 1 | 1 | 2 | 0 | 30 | Hexene-3, 100%. |
| C | 1 | 1 | 4 | 40 | 30 | Hexenes, 60%. Heptenes, 16%. Pentenes, 16%. Octenes, 4%. Butenes, 4%. |
| C | 1 | 1 | 4 | 55 | 60 | Hexenes, 45%. Heptenes, 21%. Pentenes, 19%. Octenes, 7%. Butenes, 5%. Nonenes, 3%. |

EXAMPLE 4

Disproportionation of pent-2-ene using a solution of $WOCl_4$ (Solid) dissolved in benzene as tungsten precursor solution To four batches of an anhydrous air-free mixture of pent-2-ene (10 mls.) in benzene (15 mls.) were added quantities of an 0.0025 molar solution of tungsten oxytetrachloride, $WOCl_4$, in benzene such that the molar ratio in the resultant solutions of olefines to tungsten compound was 5000:1 in each case. [The concentration of $WOCl_4$ which can be obtained in benzene solution by taking up solid $WOCl_4$ is substantially less than that which can be obtained by in situ formation of $WOCl_4$ by alcohol reaction with $WCl_6$, as aforedescribed.] Quantities of a hydrocarbon solution of ethyl aluminium dichloride were added to these tungsten/olefine-containing solutions such that the atomic ratios of aluminium to tungsten in the several cases were as set out in the following Table III. The reaction conditions and times were the same as for the experiments whose results were set out in Table I. Table III shows in addition the percent pentene conversions, whether the product olefine mixtures were of Type I or Type II, and the molar ratio of $C_4$ and $C_6$ olefines jointly to other higher olefines jointly in the product olefine mixtures.

TABLE III

| Catalyst mole ratios | | Pentene conversion, percent | Product type | Mole ratio $C_4+C_6$: other products |
|---|---|---|---|---|
| $WOCl_4$ | $EtAlCl_2$ | | | |
| 1 | 1.5 | 50 | I | |
| 1 | 2 | 50 | I | |
| 1 | 3 | 60 | II | 7.5:1 |
| 1 | 4 | 48 | II | 40:1 |

We claim:
1. In a process for converting mono-olefines to other mono-olefines of higher and lower molecular weights by disproportionation in the liquid phase using a catalyst system whose ingredients ar a molybdenum, tungsten or rhenium halogen-containing compound, an alkanol, and an organo-aluminium compound selected from aluminium alkyls and aluminium alkyl halides, the improvement which consists in (1) employing an atomic ratio of the metal of the organo-metal compound to molybdenum, tungsten or rhenium which is greater than 2:1, and (2) removing hydrogen halide coproduced during formation of the catalyst system as a result of inter-reaction of catalyst ingredients before using the catalyst system in the disproportionation reaction, whereby to produce an extended molecular weight range of olefine products through co-participation of olefines formed in situ by double-bond isomerisation.

2. A process as claimed in claim 1, wherein a tungsten compound is used that has been prepared by reacting a tungsten hexahalide in solution in an organic solvent with an alcohol to form an alkoxy derivative of the hexahalide and thereafter purging the solution of released hydrogen halide, the tungsten compound being used for the process dissolved in said purged solution without isolation.

3. A process as claimed in claim 1 wherein the molybdenum, tungsten or rhenium compound is a molybdenum, tnugsten or rhenium halide and the molar ratio of molybdenum, tungsten or rhenium halide to the alkanol is from 1:1 to 1:3.

References Cited
UNITED STATES PATENTS
3,535,401  10/1970  Calderon et al. _____ 260—683

PAUL M. COUGHLAN, JR., Primary Examiner

C. E. SPRESSER, JR., Assistant Examiner

U.S. Cl. X.R.

260—683.2